United States Patent [19]

Cline

[11] 4,318,448
[45] Mar. 9, 1982

[54] LAND TOWING VEHICLE FOR SMALL AIRCRAFT

[76] Inventor: Jack M. Cline, P.O. Box 160, Clarksville, Ark. 72830

[21] Appl. No.: 895,456

[22] Filed: Apr. 11, 1978

[51] Int. Cl.³ .............................................. B60P 3/06
[52] U.S. Cl. ................................ 180/14 C; 180/19 H
[58] Field of Search ................ 180/14 C, 14 R, 19 R, 180/19 H, 74, 65 R; 214/334

[56] References Cited

U.S. PATENT DOCUMENTS

| | | | |
|---|---|---|---|
| 598,314 | 2/1898 | Crowdus | 180/65 R |
| 2,468,669 | 4/1949 | Holmes | 180/14 C |
| 2,544,831 | 3/1951 | Guyton | 180/74 X |
| 2,771,959 | 11/1956 | Phelps | 180/19 R |
| 2,773,703 | 12/1956 | Ferguson | 180/14 C |
| 2,944,616 | 7/1960 | Bernard | 180/19 R |
| 3,038,550 | 6/1962 | Lehmann | 280/405 X |
| 3,182,742 | 5/1965 | Dow | 180/65 R |
| 3,662,911 | 5/1972 | Harman | 214/334 |
| 4,005,760 | 2/1977 | Gunderson | 180/74 |

*Primary Examiner*—John P. Silverstrim

*Attorney, Agent, or Firm*—Charles R. Rhodes; Judith G. Smith

[57] ABSTRACT

A lightweight, yet heavy duty, self-contained towing vehicle of relatively small size and designed for maximum maneuverability in confined quarters, driven by a multi-speed, electric motor in which the forward speed is greater than the reverse speed. The steering control handle is pivotally mounted in cooperative relation to the drive wheels to act as a manual differential clutch thus facilitating maneuverability and convert the vehicle from power driven to freewheeling and even to somewhat control the speed of the vehicle. A clamp-on bracket is pivotally mounted about a vertical axis on the front end of the vehicle and selectively adapted to engage and hold a conventional tow bar of the type provided with the aircraft. The vehicle is battery powered and has two electrical systems, a first which drives the vehicle forwardly at one speed and a second, which drives the vehicle in reverse at a second slower speed. Outlets to the voltage supply of each system are provided for use with jumper cables to start the aircraft when its own power supply is low.

5 Claims, 4 Drawing Figures

LAND TOWING VEHICLE FOR SMALL AIRCRAFT

BACKGROUND OF THE INVENTION

The prior art reveals several patents relating to tow vehicles of the type use for maneuvering aircraft into and out of hangers or otherwise on the ground. Among those patents considered to be representative of the present invention are U.S. Pat. No. 3,025,922 to Savidge; U.S. Pat. No. 3,038,550 to Lehmann et al; and U.S. Pat. No. 3,662,911 to Harman. The tow vehicles disclosed in the Savidge and Lehmann patents are both gasoline powdered and both are of the type which engage the axle of the aircraft nose wheel to connect the vehicle thereto for moving the craft over the ground. The Savidge vehicle is designed to move small and medium size aircraft but is still of rather large and complicated structure. A friction drive means is provided by Savidge which actually engages the nose wheel of the aircraft in order to move the craft, therefore making it extremely difficult to maneuver and control manually if necessary. The Lehmann vehicle is used for moving jet fighter planes from hangers and parking areas to the ready line. As mentioned before the Lehmann vehicle is gasoline powered and is of a design which secures the nose wheel of the aircraft in order to move it. Consequently, Lehmann's vehicle and others like it are of much heavier structure and are thereby more difficult to maneuver and probably expensive for small private fixed base operations.

Of the patents cited above the Harman U.S. Pat. No. 3,662,911 is the only small, electrically operated tow vehicle. Harman discloses that the batteries may be omitted and the D.C. motor driven by an electrical connection to the aircraft battery or to the aircraft ground power supply. The D.C. motor is connected to a sprocket on the axle of the tow vehicle and thus operates at one speed only. Unless this speed is very slow, maneuverability is limited. Further, the Harman vehicle cannot be freewheeling. As an added disadvantage the Harman device, as do many others in the prior art, uses a scoop or platform to support the nose wheel of the aircraft while the craft is being towed, rather than direct towing. There is no disclosed difference in speed in towing forwardly or in reverse.

SUMMARY OF THE INVENTION

The present invention is directed to the provision of an aircraft towing vehicle which is of relatively small size, lightweight, and which may be selectively maneuvered by freewheeling, or by an electric motor. The tow vehicle is easily coupled to any aircraft by means of any standard T- or loop-type tow bar provided by the aircraft manufacturer, with no necessity for lifting or in any way engaging the nose wheel or its wheel parts. Because it doesn't support the aircraft the vehicle according to the present invention is of lighter weight and a smaller scale which allows for greater maneuverability even when in the free wheeling mode.

Power to move the vehicle is provided by means of two 12-volt batteries connected in series during forward motion so that 24 volts are applied to the motor. Only one of the batteries is connected in the reverse motion circuit, so that 12 volts are then available. Outlets are provided for plugging a pair of starter cables directly into the vehicle batteries so that the aircraft batteries may be jumped from the towing vehicle when necessary.

The frame or main body portion of the towing vehicle according to the present invention is relatively lightweight and of small size. The smaller frame of the vehicle is possible because it is not necessary that the towing vehicle support any portion of the aircraft when moving it. There is no engagement of the tow vehicle with the nose wheel because connection of the aircraft to the vehicle is solely by means of the standard tow bar provided with the aircraft. A clampon bracket is mounted at the rear portion of the towing vehicle for engaging and holding the various types of tow bars which are provided as standard equipment. Therefore, when the present invention is employed there is no necessity that a hanger or fixed base operator provide various types of towing vehicles in order to be compatible with the various types of small and medium sized aircraft housed therein.

The frame of the towing vehicle according to the present invention is supported and moved along the ground by means of a plurality of ground engaging wheels of which at least a pair are power driven from the electric motor. A forward guide caster and, if desired, a rear caster serve to facilitate turning of the two vehicle as well as preventing tilting of the vehicle. A steering handle is hingedly mounted adjacent the forward section of the vehicle and is used for manually guiding the vehicle and also as a clutch means for causing alternate frictional engagement and disengagement of a pair of drive wheels to the ground engaging wheels. When the drive wheels are engaged with the ground wheels, power from the motor is transmitted to the ground engaging wheels.

The two drive wheels are so connected to and operated by the steering handle that they are moved into contact with the ground wheels upon lowering the steering handle. When so lowered the handle is latched in the drive position. This latch is easily released when desired and the drive wheels disengaged by an upward spring bias against the handle frame. When the drive wheels are disengaged the towing vehicle is completely freewheeling which provides greater maneuverability in tight places.

Direction of rotation of the drive wheels is controlled by a selector switch which reverses the flow of current in the D.C. motor. In the reverse mode only 12 volts is fed to the motor so that it turns at a lesser speed.

Therefore, the objects of the present invention include:

1. The provision of an aircraft ground towing vehicle which may be selectively adapted to engage and secure the tow bar provided with a given aircraft;
2. The provision of an aircraft ground towing vehicle which is battery powdered and which includes outlets for plugging jumper cables thereto leading to the aircraft to jumpstart the aircraft engine if necessary;
3. The provision of an aircraft ground towing vehicle, the power source of which produces two differing outputs to permit forward motion at a first speed and a reverse motion at a second, lesser speed;
4. The provision of an aircraft ground towing vehicle which is relatively light in weight and of small frame for ease of maneuverability in confined areas; and 5. An aircraft ground towing vehicle which may be more quickly and easily shifted from an electric powered mode to a freewheeling mode.

Other objects and advantages of the present invention will become obvious to those skilled in the art as they study the following detailed description of a preferred embodiment in conjunction with the accompanying drawings in which.

DETAILED DESCRIPTION OF A PREFERRED EMBODIMENT

Figure 1:
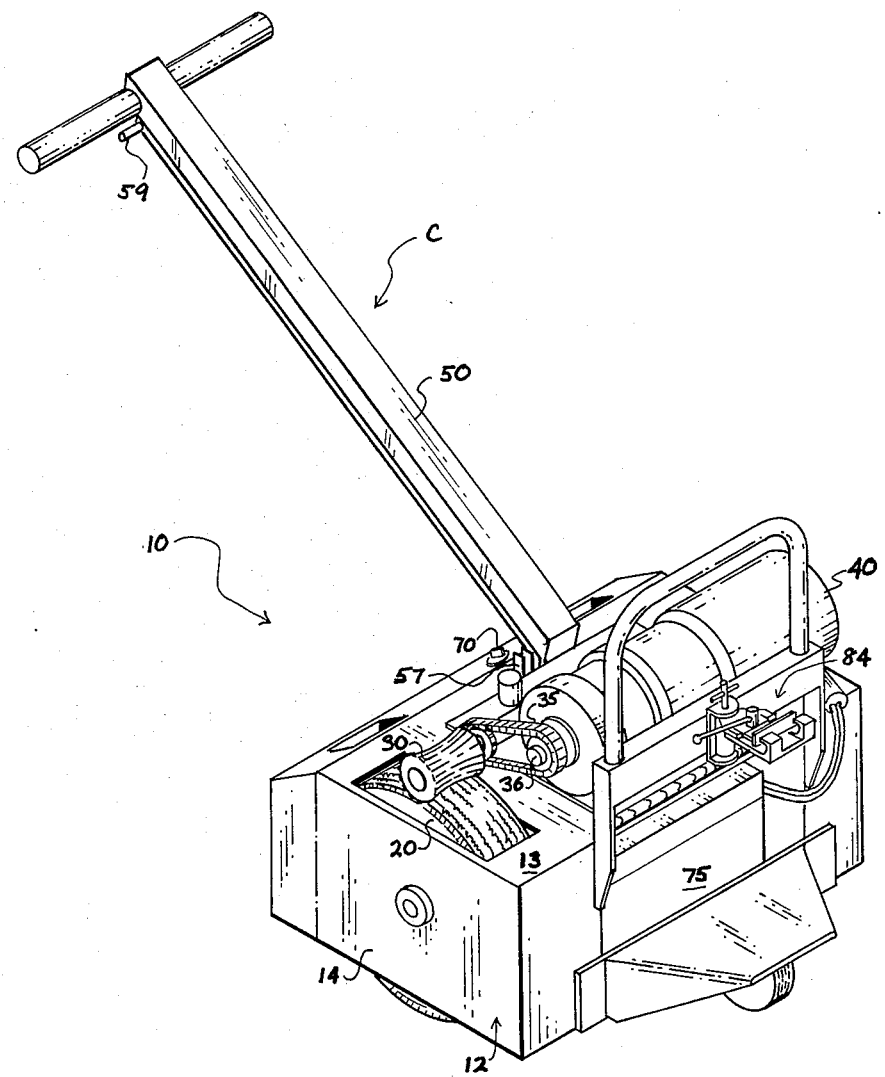
FIG. 1 is a perspective view of a preferred embodiment of the present invention as seen from the rear side.

Referring to FIG. 1 the towing vehicle 10 is seen in perspective looking at a rear corner and includes generally a rectangular shaped frame 12 having a top side 13 and surrounding side walls 14. A pair of opposed ground engaging wheels 20 are rotatable around a common axis (not shown) and, as seen in FIG. 1 are selectively frictionally engaged by a pair of opposed drive wheels 30. The drive wheels 30 are driven by means of a sprocket chain 35 which is attached to a pulley 36 which in turn is driven by a D.C. motor 40.

The vehicle 10 is guided and otherwise, as set forth hereinbelow, manually controlled by means of a control means C which is hingedly mounted to frame 12 and extends out over the forward side of the tow vehicle. In addition to being used for steering, pulling or pushing, the vehicle 10 the control means C also controls the frictional engagement of the drive wheels 30 to the ground wheels 20. Looking at FIG. 1, it can be seen that the control means C includes a steering handle 50 mounted to the front edge of a rectangular plate-like device 52 which, in turn, has the rear edge hingedly attached to the top surface 13 of the frame 12.

A pair of bearing brackets 60 are attached to the top surface of the plate 52 each including a bearing therein. A drive wheel connection shaft 36 is journaled in bearing brackets 60 for rotation. Drive wheels 30 include a serrated periphery and are attached to opposite ends of shaft 36 for rotation therewith. A pair of compression springs 55 are positioned between the upper surface 13 of frame 12 and the plate 52 to normally bias the plate upward and maintain the drive wheels 30 in a neutral position out of engagement with wheels 20. To engage the drive wheels 30 with the ground wheels 20 the steering handle 50 is lowered against the spring pressure to a point of wheel engagement. Upon full lowering of handle 50 a latching mechanism 57 moves into a lock position and maintains the plate 52 in the lowered position and the wheels in an engaged position until such time as the operator releases the latch by a release 59 and the springs 55 urge the plate 52 upward.

As evident by this construction, with a little experience the operator can easily shift the vehicle between the power driven and freewheeling modes. Further, with more experience the handle 50 may be raised and lowered slightly to control the speed.

Forward and reverse motion is controlled by the switching mechanism 70 mounted just under the steering handle 50 on one of the side walls 14. The switching mechanism is a conventional three position switch including an off position, a forward position, and a reverse position. With the switch 70 turned to the forward position, current flows through motor 40 in one direction and the towing vehicle 10 will move forward. When the switch is turned to the reverse position current flows in the opposite direction and the towing vehicle 10 will move backward. When the switch is turned off or the drive wheels disengaged, the towing vehicle may be pulled or pushed manually in any direction. A front guide caster 25 turns or swivels in any direction adding to the maneuverability of the vehicle as well as preventing tilting of the vehicle as the weight or load shifts during towing.

The vehicle power sourve comprises two 12-volt batteries 75 connected in series in such a manner that when the vehicle 10 is in the forward mode it is receiving maximum energy from both batteries or a voltage value of 24 volts (see FIG. 6). Conversely when the vehicle 10 is in the reverse mode and is most likely pushing an aircraft backwards and therefore requiring a slower speed to maintain greater control, the vehicle receives energy from only one of the batteries or a voltage value of 12 volts.

A 12-volt outlet 77 and a 24-volt outlet 77′ are provided in frame 12 for use with jump cables to jumpstart an aircraft if necessary. It is well known that many airplanes have very small batteries which are frequently inadequate for starting the aircraft, particularly during the winter. All of these airplanes include receptacles for plugging in cables to jumpstart the aircraft, and the towing vehicle 10 has identical cooperating receptacles so that a standard double female jumper cable can be used. When the towing vehicle 10 is not in use it is connected to a 24-volt automatic charger which keeps both 12-volt batteries at peak energy levels.

Figure 4:
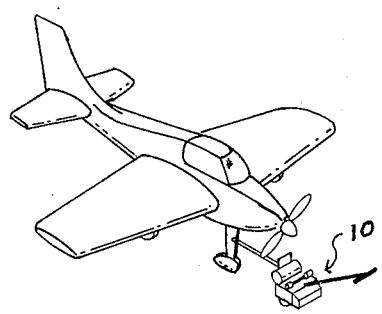
FIG. 4 is an environmental perspective view of the apparatus shown in FIGS. 1 and 2.
Figure 2:
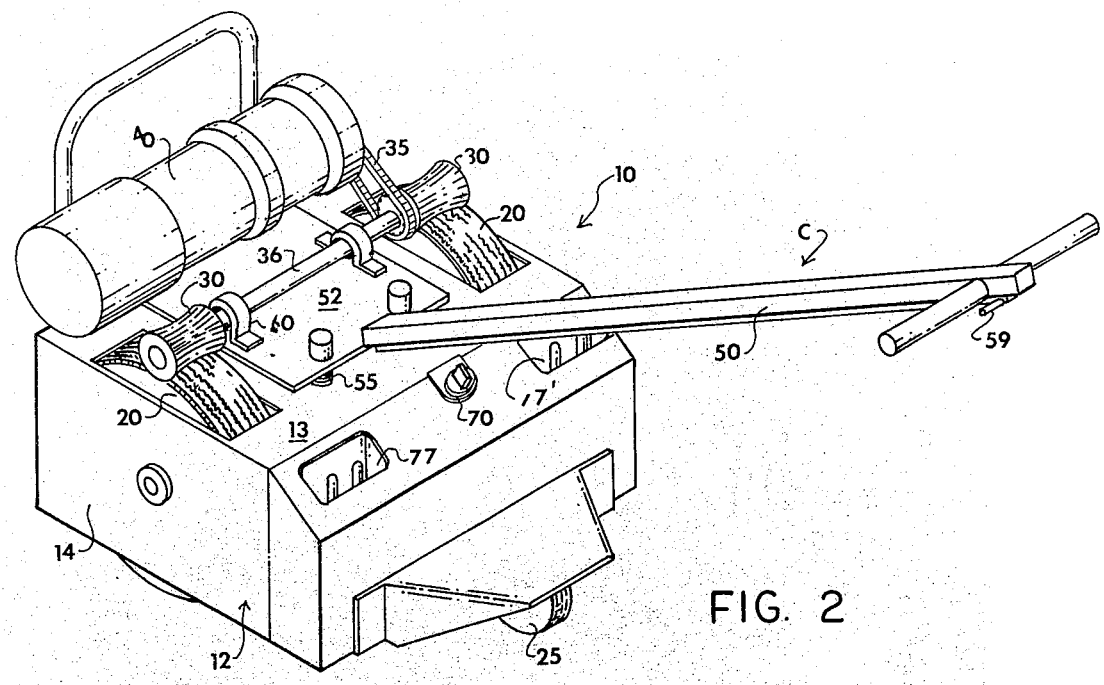
FIG. 2 is a perspective view of a preferred embodiment of the invention as seen from the front side.
Figure 3:
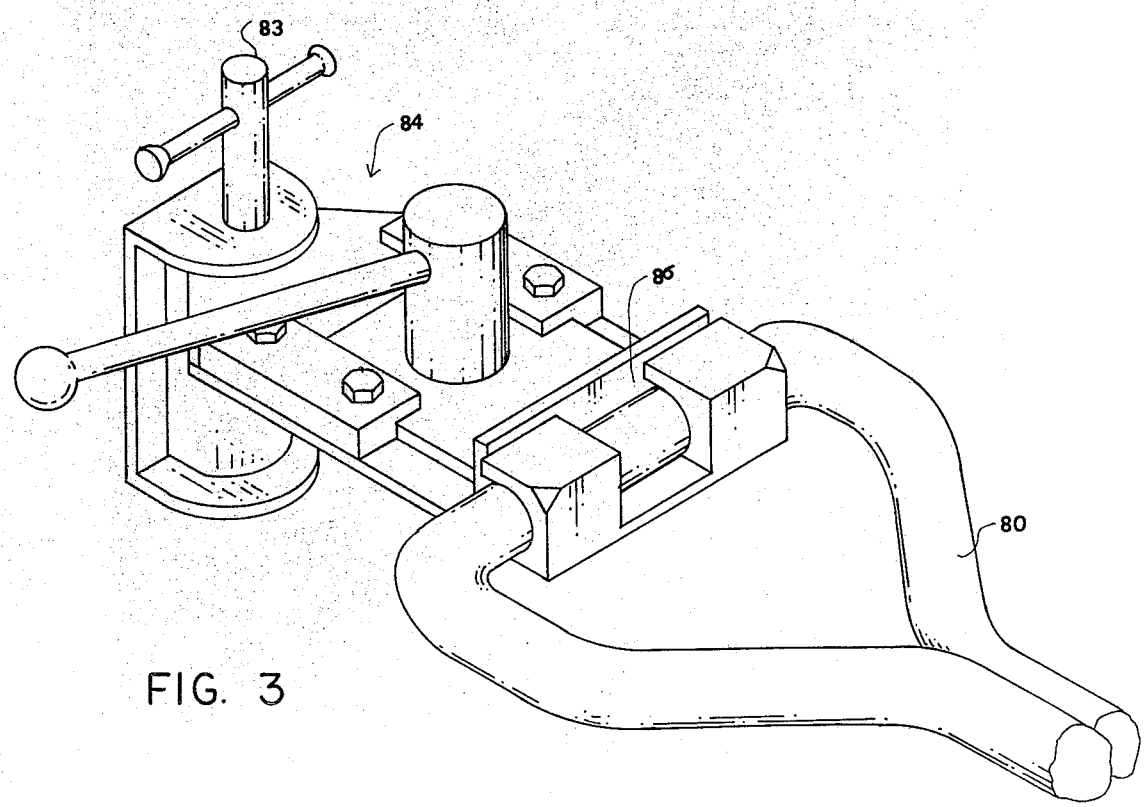
FIG. 3 is an enlarged perspective of the tow bar connection means.

To utilize the towing vehicle 10 the operator obtains the standard tow bar supplied with the particular aircraft and attaches the tow bar 80 (FIG. 3) to the towing vehicle 10 by means of a retaining pin 83 and a swivel bracket 84 which is mounted to the rear of the frame 12. In the preferred embodiment as illustrated in FIG. 3 the head of the tow bar 80 fits in retaining groove 85 in one end of bracket 84. Retaining pin 83 fits in a swivel connection in the outer end of bracket 84. FIG. 4 illustrates the connection of the tow bar to the aircraft at a point above the wheel cover. It is important to note that the present invention can be used to tow fixed gear aircraft having wheel covers without any danger of scratching the paint or otherwise damaging the wheel cover.

It is also important to note that because the only connection of the aircraft to the towing vehicle is by means of the standard tow bar furnished with the aircraft, the connection time may be merely a matter of seconds. There is no necessity for lifting the nose wheel onto the towing vehicle; the towing vehicle is merely moved to the aircraft, the tow bar connected to both the aircraft in the conventional manner and then to the towing vehicle, whereupon the aircraft may be towed to any location.

While the above discussion of FIGS. 3 and 4 has included one type of tow bar and connection bracket 84, the towing vehicle 10 and its bracket are compatible for connection to any type of standard tow bar, such as a T-bar, as may be provided with aircraft.

Further modifications to the towing vehicle 10 may be made without departing from the scope of the claims below.

What is claimed is:

1. A land towing vehicle for aircraft comprising:
   (a) a frame having a plurality of ground engaging wheels mounted thereon;
   (b) a motor mounted on said frame;
   (c) control means hingedly mounted to said frame for guiding said towing vehicle and selectively connecting said motor to said ground wheels for shifting from a first freewheeling mode to a second power driven mode;
   (d) biasing means associated with said control means for normally biasing said control means in said first freewheeling mode;
   (d) means attached to said frame for releasably connecting a standard tow bar as supplied with the aircraft.

2. The towing vehicle according to claim 1 wherein said motor comprises a DC motor mounted on said frame and having means for applying a first voltage value thereto in a forward mode and a second voltage value thereto in a reverse mode.

3. The towing vehicle according to claim 1 wherein said control means includes:
   (a) a plate having the rear end hingedly connected to the upper surface of said frame and movable between a first freewheeling position and a second power driven position;
   (b) a steering handle attached to and extending from the forward end of said plate;
   (c) drive wheel means attached to said plate and operatively connected to said motor, engagement of said drive wheel with said ground engaging wheels being responsive to movement of said plate from said first to said second position.

4. A towing vehicle for aircraft as provided in claim 2 further including a first electrical outlet means on said frame corresponding to said first voltage value and a second electrical outlet means on said frame corresponding to said second voltage value, and separate cable means for selectively connecting the aircraft motor to either said first or second outlets to jumpstart the aircraft.

5. A ground towing vehicle for aircraft as provided in claim 2 wherein said second voltage of said power source is of a value lower than said first voltage value.

* * * * *